(12) United States Patent
Müller et al.

(10) Patent No.: US 11,661,171 B2
(45) Date of Patent: May 30, 2023

(54) INTERNAL CLADDING PART FOR CLADDING A FUSELAGE STRUCTURE OF AN AIRCRAFT

(71) Applicant: Airbus Operations GmbH, Hamburg (DE)

(72) Inventors: Rainer Müller, Hamburg (DE); Ralf Schliwa, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 17/456,188

(22) Filed: Nov. 23, 2021

(65) Prior Publication Data
US 2022/0081099 A1 Mar. 17, 2022

Related U.S. Application Data

(62) Division of application No. 16/849,451, filed on Apr. 15, 2020, now Pat. No. 11,420,721.

(30) Foreign Application Priority Data

Apr. 17, 2019 (DE) .............................. 102019205578

(51) Int. Cl.
*B32B 27/14* (2006.01)
*B64C 1/40* (2006.01)
(Continued)

(52) U.S. Cl.
CPC ................ *B64C 1/40* (2013.01); *B32B 3/12* (2013.01); *B32B 5/16* (2013.01); *B32B 27/14* (2013.01);
(Continued)

(58) Field of Classification Search
CPC .......... B32B 2264/102; B32B 2605/18; B32B 27/14; B32B 27/20; B32B 3/12;
(Continued)

(56) References Cited

U.S. PATENT DOCUMENTS

| | | |
|---|---|---|
| 9,085,351 B2 | 7/2015 | Burd |
| 11,420,721 B2 * | 8/2022 | Müller ...................... B64C 1/40 |
| 2011/0006159 A1 | 1/2011 | Herrmann et al. |

FOREIGN PATENT DOCUMENTS

| | | |
|---|---|---|
| DE | 10 2004 011 614 | 2/2005 |
| DE | 10 2006 028 956 | 1/2008 |

(Continued)

OTHER PUBLICATIONS

German Search Report for DE102019205578.8, dated Nov. 4, 2019, 10 pages.

(Continued)

*Primary Examiner* — Lawrence D Ferguson
(74) *Attorney, Agent, or Firm* — Nixon & Vanderhye P.C.

(57) ABSTRACT

An internal cladding part for cladding a fuselage structure of an aircraft is disclosed having a first cover layer that extends in a planar manner, a second cover layer that extends in a planar manner, a core layer which is disposed between the first and the second cover layer and is connected to the first and the second cover layer and defines a receptacle cavity, and an insulation structure having a porous insulation core and an evacuated film sheath that encases the insulation core in a gas-tight manner. The insulation structure is disposed in the receptacle cavity between the first and the second cover layer.

10 Claims, 3 Drawing Sheets

(51) Int. Cl.
  *B32B 3/12* (2006.01)
  *B32B 5/16* (2006.01)
  *B32B 27/20* (2006.01)
  *B64C 1/06* (2006.01)

(52) U.S. Cl.
  CPC .............. *B32B 27/20* (2013.01); *B64C 1/067* (2013.01); *B32B 2264/102* (2013.01); *B32B 2605/18* (2013.01)

(58) Field of Classification Search
  CPC ........... B32B 5/16; B64C 1/066; B64C 1/067; B64C 1/40; Y02T 50/40
  See application file for complete search history.

(56) References Cited

FOREIGN PATENT DOCUMENTS

| | | |
|---|---|---|
| DE | 10 2004 001 049 | 12/2009 |
| EP | 1 157 824 | 11/2001 |
| EP | 1 258 343 A2 | 11/2002 |
| EP | 1 258 343 A3 | 12/2004 |
| WO | 2006/083314 | 8/2006 |
| WO | 2011/016698 A2 | 2/2011 |
| WO | 2011/016698 A3 | 2/2011 |
| WO | 2011/016698 A4 | 2/2011 |

OTHER PUBLICATIONS

German Search Report for German Application No. 20167004.9, five pages, dated Sep. 14, 2020.

\* cited by examiner

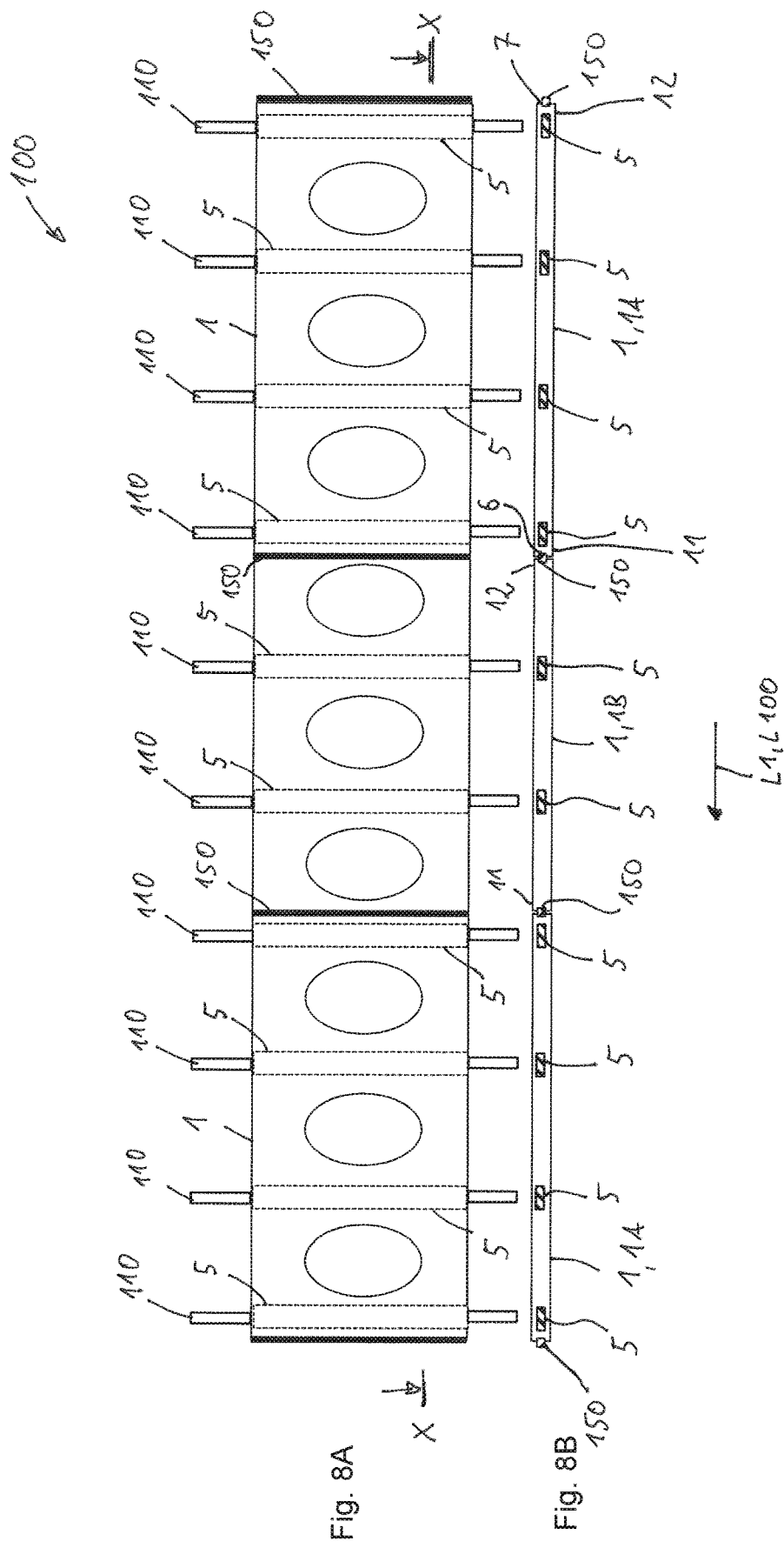

INTERNAL CLADDING PART FOR CLADDING A FUSELAGE STRUCTURE OF AN AIRCRAFT

CROSS RELATED APPLICATIONS

This application is a Divisional application of U.S. patent application Ser. No. 16/849,451, filed Apr. 15, 2020, which claims priority to German Patent Application DE 102019205578.8, filed Apr. 17, 2019, the entire contents of each of which is hereby incorporated by reference.

FIELD OF THE INVENTION

The present invention relates to an internal cladding part for cladding a fuselage structure of an aircraft, as well as to a fuselage structure for an aircraft.

BACKGROUND OF THE INVENTION

A fuselage of an aircraft typically has a frame structure having a multiplicity of formers as well as an external skin which is fastened to the frame structure. The frame structure defines an interior space, or a cabin, respectively, of the aircraft, wherein the frame structure per se on a side facing the interior space is usually cladded with internal cladding parts. In order for comfort to be enhanced, or for generally improving the air-conditioning of the interior space, an insulation is attached between the internal cladding and the external skin, wherein insulation material is also disposed between the formers and the internal cladding so as to avoid the formation of thermal bridges.

It is desirable in passenger aircraft as well as in cargo aircraft that the available space of the interior space defined by the frame structure is utilized as efficiently as possible. Against this background, DE 10 2006 028 956 A1 describes an interior cladding part for cladding the fuselage structure of an aircraft, having a core material which is disposed between two cover tiers and has cavities, and a gas-tight film that surrounds the core material, wherein the cavities are evacuated.

WO 2006/083314 A2 describes the use of an insulation material in an internal cladding part of an aircraft, the insulation material comprising a multiplicity of evacuated cells. DE 10 2004 011 614 A1 describes a vacuum insulation part having an open-pore core material which is disposed in a gas-tight sheath. A further vacuum insulation part is described in EP 1 157 824 A2.

SUMMARY

The present disclosure provides an improved insulation concept for the fuselage of an aircraft.

According to an exemplary embodiment, an internal cladding part for cladding a fuselage structure of an aircraft is provided. The internal cladding part comprises a first cover layer that extends in a planar manner, a second cover layer that extends in a planar manner, a core layer which is disposed between the first and the second cover layer and is connected to the first and the second cover layer and defines a receptacle cavity, and an insulation structure having a porous insulation core and an evacuated film sheath that encases the insulation core in a gas-tight manner. The insulation structure is disposed in the receptacle cavity between the first and the second cover layer.

According to an exemplary embodiment, a fuselage structure for an aircraft is provided. The fuselage structure has a multiplicity of formers which are disposed so as to be mutually spaced apart along a fuselage longitudinal direction and define a fuselage interior space. The fuselage structure furthermore has an internal cladding part according to the first aspect of the invention which in terms of the fuselage longitudinal direction is disposed in the fuselage interior space so as to overlap with at least one former, wherein the insulation structure of the internal cladding part in terms of the fuselage longitudinal direction is disposed so as to overlap with the former.

A concept underlying the invention lies in improving in a space-saving manner a thermal insulation in the region of a former of a fuselage structure by integrating a vacuum-insulated insulation structure in the cross section of an internal cladding part which dads the respective former. In particular, an internal cladding part with a sandwich construction is provided, wherein a core layer, for example a honeycomb core, which is disposed between two cover layers has a recess into which the insulation structure is placed. The insulation structure has a porous insulation material which in a gas-tight manner is packed into a film bag, wherein the film bag is evacuated. The insulation material is thus largely free of gas, on account of which an extremely minor cross-sectional thickness of the insulation structure is achieved together with a very positive insulation effect.

One of the advantages of the invention lies in that the insulation structure is disposed between the two cover layers and is laterally surrounded by the core layer which forms the core layer of the internal cladding part. On account thereof, the insulation structure is ideally protected in relation to mechanical damage. This prevents the vacuum in the film bag from escaping, on account of which the insulation effect is permanently ensured.

A further advantage of the integration of a vacuum-insulated structure in the cross section of the internal cladding part lies in the space-saving accommodation. In particular, an insulation effect is achieved by the internal cladding part per se, on account of which an insulation between the former and the internal cladding part can be reduced or entirely dispensed with where the insulation structure is disposed between the cover layers. On account thereof, the internal cladding part can be disposed at a smaller spacing from the frame structure of the fuselage that is configured by the formers. The available space within the fuselage structure is thus advantageously enlarged.

Advantageous design embodiments and refinements are derived from the dependent claims that refer back to the independent claims, in conjunction with the description.

According to one embodiment of the internal cladding part it is provided that the receptacle cavity is free of a core layer and extends between a first internal face of the first cover layer that faces the second cover layer and a second internal face of the second cover layer that faces the first cover layer, and that the film sheath of the insulation structure is connected to the first internal face and to the second internal face. The receptacle cavity is thus formed by a planar passage opening through the entire core layer, and the insulation structure, or the film of the insulation structure, respectively, is connected, for example adhesively bonded, directly to the internal faces of the cover layers. This offers the advantage that the insulation layer at a given spacing between the cover layers can be embodied with the maximum thickness, on account of which the insulation effect is further improved. On account of the insulation structure being connected to the cover layers, the insulation structure per se advantageously contributes towards the mechanical strength of the internal cladding part.

According to one further embodiment the porous insulation core is formed by pulverulent material. The insulation core can thus be formed by a granulate which is enclosed in the evacuated film bag. This advantageously facilitates the shaping of the insulation core. The pulverulent material can be compressed, for example. For example, pyrogenic silica, in particular Aerosil®, is particularly considered as a material. Materials of this type offer the advantage that they are not combustible and moreover achieve a high thermal insulation effect.

According to one further embodiment it is provided that the insulation structure having a thickness in a range between 3 mm and 11 mm extends between the first and the second cover layer. A particularly positive insulation effect at a relatively minor overall thickness of the interior cladding part is achieved in this thickness range. The thickness of the insulation structure can in particular be in a range between 5 mm and 8 mm. A particularly space-saving construction is achieved herein. Optionally, the thickness of the insulation structure is consistent.

According to one further embodiment it is provided that the first cover layer and the second cover layer are in each case formed from a fibre-reinforced plastics material. For example, glass fibres can be embedded as reinforcement fibres in a thermoplastic or durable plastic matrix material. Cover layers from fibre-reinforced plastics material, in combination with the integration of the insulation structure in the sandwich construction, offer the advantage that the cover layers have high mechanical strength, in particular flexural rigidity, on account of which the mechanical protection of the insulation structure is further improved.

According to one further embodiment of the internal cladding part the core layer defines the receptacle cavity in the form of an elongate strip. For example, it can be provided that the internal cladding part extends so as to be curved along a cladding part circumferential direction, and the receptacle cavity runs along the cladding part circumferential direction. Mechanical weakening of the core layer is advantageously minimized on account of the strip-shaped, substantially straight, profile of the receptacle cavity.

According to one further embodiment the core layer defines at least two receptacle cavities which are disposed so as to be spaced apart along a cladding part longitudinal direction and extend so as to be mutually parallel, wherein one insulation structure is disposed in each receptacle region. In this way, two formers spaced apart in a fuselage longitudinal direction can be advantageously cladded by one internal cladding part and in each case be insulated. This advantageously reduces the complexity in terms of assembling.

According to one further embodiment it is provided that a first end region of the internal cladding part forms a first connection structure, and that a second end region of the internal cladding part that lies opposite the first end region forms a second connection structure. Optionally, the first connection structure has a groove, and the second connection structure has a tongue. Mechanically connecting, or coupling, respectively, the internal cladding parts to one another is facilitated on account of the connection structures that are disposed counter to the cladding part longitudinal direction. For example, it can be provided that the first and the second connection structure are configured so as to be mutually complementary, for example as a tongue and a groove. It can also be provided that a connecting strip is at least partially disposed between a first and a second internal cladding part, the connecting strip being designed so as to be complementary to the connection structures.

According to one embodiment of the fuselage structure the latter additionally comprises a planar external skin which is fastened to former bases of the formers, a primary insulation having first insulation mats which are disposed on an internal face of the external skin that faces the fuselage interior space, between two formers which are successive in the fuselage longitudinal direction, and second insulation mats which cover in each case one former head of a respective former that faces the interior space. The internal cladding part herein is disposed relative to the formers in such a manner that the insulation structure of the internal cladding part extends along the former and in terms of the fuselage longitudinal direction so as to overlap with the former. The former in the region of the former head is thus insulated by the second insulation mat and additionally by the insulation structure that is accommodated in the cross section of the internal cladding part, on account of which the formation of thermal bridges is further prevented.

According to one further embodiment it is provided that an end region of the internal cladding part is in each case disposed between two formers which are successive in the fuselage longitudinal direction. Accordingly, the internal cladding part by way of the cladding part longitudinal direction extends along the fuselage longitudinal direction and terminates between two formers. The connection of the end region to an end region of a further internal cladding part can therefore take place between the formers. More space for accommodating additional insulation, for example of primary insulation or other insulation installations, is available in the direction of the external skin in this region than directly on a former. The formation of a thermal bridge in the connection region between the internal cladding parts can thus be better prevented.

According to one further embodiment a plurality of internal cladding parts are disposed in succession in the fuselage longitudinal direction, wherein a connecting strip is disposed on a joint between a first internal cladding part and a second internal cladding part which is successive in the fuselage longitudinal direction. For example, the connection strip in terms of the fuselage longitudinal direction can at least be partially disposed between the internal cladding components. The connecting strip advantageously facilitates sealing between the components. The connecting strip can be attached in a simple manner, in particular without any space issues, in particular when the internal cladding parts in terms of the fuselage longitudinal direction terminate between the formers.

According to one embodiment the first and the second internal cladding part, as described above, are in each case configured having a first and a second connection structure, wherein the connecting strip is connected to the first connection structure of the first internal cladding part and to the second connection structure of the second internal cladding part. The connecting strip can be connected to the first and the second internal cladding part by way of a clip connection or any other form-fitting connection structure. Optionally, the connecting strip is configured in a profiled manner, or has a profiled cross section, respectively, the latter being constructed so as to be complementary to the first and the second connection structure. The assembling of the internal cladding parts is thus facilitated. Moreover, the sealing towards the fuselage internal space is improved, and the formation of condensation is further prevented.

Furthermore optionally, it can be provided that the connecting strip on a rear side that is oriented so as to face away from the fuselage interior space has an insulation layer. For example, the insulation layer can be configured as a vacuum-insulated structure as has been described above. However, other insulation materials are also conceivable. The formation of a thermal bridge in the transition region between two internal cladding parts is further counteracted on account of the insulation of the rear side of the connecting strip. In particular when the internal cladding parts in terms of the fuselage longitudinal direction terminate between the formers, as has been described above, the connection region lying between the formers can be even better insulated by the connecting strip.

With regard to directional indications and axes, in particular directional indications and axes relating to the profile of physical structures, a path of an axis, of a direction or of a structure "along" another axis, direction or structure is understood here as meaning that these, in particular the tangents that arise at a respective point of the structures, run in each case at an angle of less than or equal to 45 degrees, preferably less than or equal to 30 degrees, and particularly preferably parallel, to one another.

With regard to directional indications and axes, in particular directional indications and axes relating to the profile of physical structures, a path of an axis, of a direction or of a structure "transversely" with respect to another axis, direction or structure is understood here as meaning that these, in particular the tangents that arise at a respective point of the structures, run in each case at an angle of greater than or equal to 45 degrees, preferably greater than or equal to 60 degrees, and particularly preferably perpendicular, to one another.

BRIEF DESCRIPTION OF THE DRAWINGS

The invention will be explained in greater detail with reference to exemplary embodiments depicted in the drawings as appended.

FIG. 8A shows a plan view of a fuselage structure according to one further exemplary embodiment of the invention; and, FIG. 8B shows a sectional illustration of FIG. 8A.

Unless otherwise stated, the same reference signs identify identical or functionally equivalent components in the figures.

DETAILED DESCRIPTION

Figure 1:
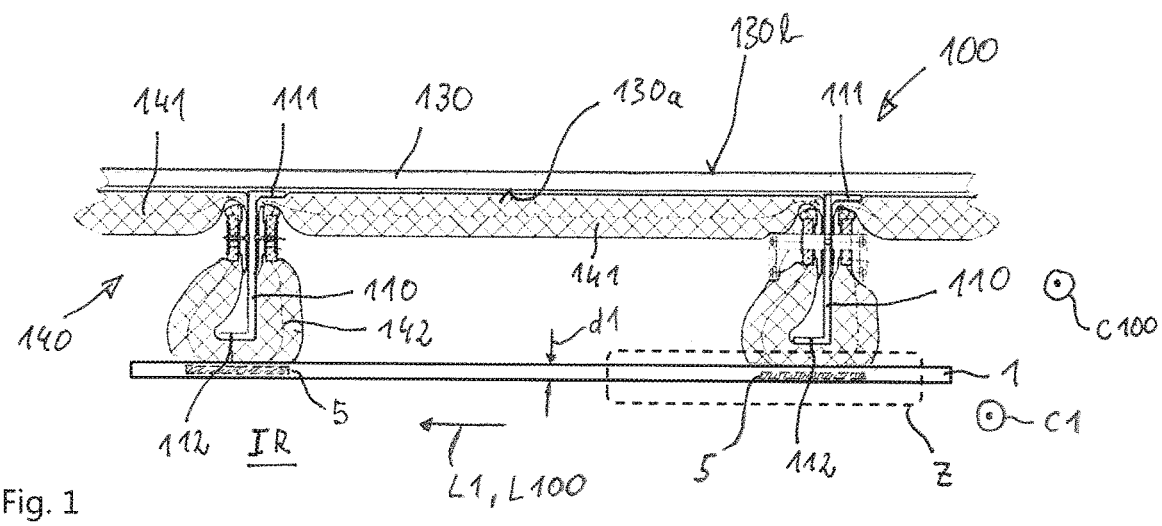
FIG. 1 shows a sectional view of a fuselage structure according to one exemplary embodiment of the invention.
Figure 4:
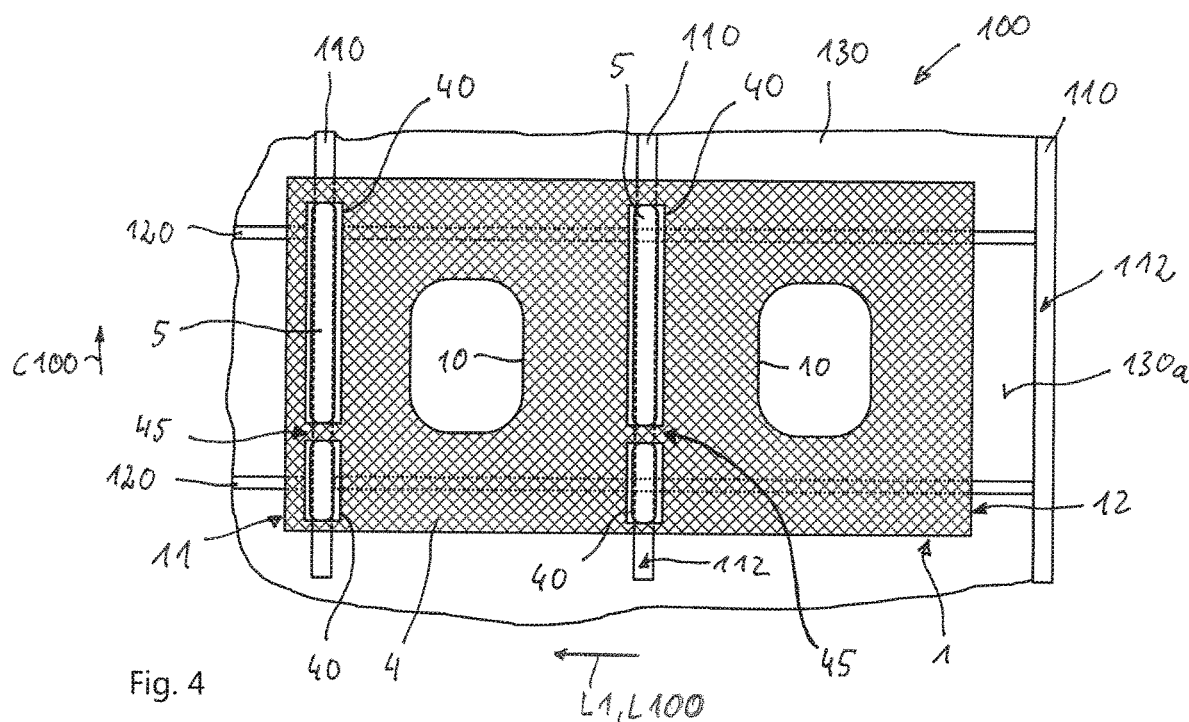
FIG. 4 shows a plan view of a fuselage structure according to one further exemplary embodiment of the invention.

FIG. 1 in an exemplary and schematic manner shows a sectional view of a fuselage structure 100 of an aircraft, for example of a passenger aircraft. The fuselage structure 100 illustrated in an exemplary manner has a multiplicity of formers 110, at least one internal cladding part 1, an optional external skin 130, and an optional primary insulation 140. FIG. 4 schematically shows a plan view of the fuselage structure 100, wherein the internal cladding part 1 in FIG. 4 is illustrated in a partial sectional view, and the primary insulation 140 is not illustrated for reasons of clarity. As can be seen in FIG. 4, the fuselage structure 100 additionally has optional longitudinal supports 120.

The formers 110 can in particular be implemented as profiled supports having in each case one former base 111 and one former head 112. As is illustrated in an exemplary manner in FIG. 1, the formers 110 can in each case have a Z-shaped cross-section. Each former 110 forms in each case one closed, for example circular, frame. The formers 110, as is schematically illustrated in FIGS. 1 and 4, extend so as to be mutually parallel and are disposed so as to be mutually spaced apart along a fuselage longitudinal direction L100. The formers 110 on account thereof define a fuselage interior space IR. The formers 110 can be formed, for example, from a fibre-reinforced plastics material, in particular a carbon-fibre-reinforced thermoplastic material, or from a metal material such as, for example, titanium or aluminium alloy.

The longitudinal supports 120 can likewise be configured as profiled supports, for example having an Ω-shaped cross-section. As is illustrated in an exemplary manner in FIG. 4, the longitudinal supports 120 extend along the fuselage longitudinal direction L100 and are in each case disposed so as to be mutually spaced apart along a fuselage circumferential direction C100. The longitudinal supports 120 can also extend so as to be mutually parallel, for example. The longitudinal supports 120 are connected to the formers 110, or fastened to the latter, respectively. The longitudinal supports 120 and the formers 110 conjointly form a fuselage frame structure. The longitudinal supports 120 can formed, for example, from a fibre-reinforced plastics material, in particular a carbon-fibre-reinforced thermoplastic material, or from a metal material such as, for example, a titanium or aluminium alloy.

The optional external skin 130 is implemented by skin segments or sheets which extends in a planar manner and are fastened to the former bases 111. The external skin 130 has an internal face 130a that faces the formers 110, or the interior space IR, respectively, and an external face 130b that lies so as to be opposite to the internal face 130a. The external face 130b forms an external face of the aircraft, in particular a flow surface.

As is illustrated in an exemplary manner in FIG. 1, the optional primary insulation 140 can have first insulation mats 141 and second insulation mats 142. The insulation mats 141, 142 are in each case formed from a thermally insulating material such as, for example, glass wool or another mineral wool. For protection against moisture, the insulating material of the insulation mats 141, 142 can be encapsulated, or packed, respectively, in a plastics-material sheath (not illustrated). As is illustrated in an exemplary manner in FIG. 1, the first insulation mats 141 on the internal face 130a of the external skin 141 extends between two formers 110 which are successive in the fuselage longitudinal direction L100, or are disposed on the external skin 130, respectively. For example, the first insulation mats 141 can be fastened to the formers 110, for example be jammed on the latter. The second insulation mats 142 on a former 110, on a first side of the former 110 extend in each case from the former base 111 to the former head 112, beyond the former head 112, and on a second side of the former 112 extend from the former head 112 to the former base 111. The second insulation mats 142 thus cover the former head 112 of a respective former 110, as is illustrated in an exemplary manner in FIG. 1. The second insulation mats 142 can be fastened to the respective former 110 by means of bolts, for example, as is schematically illustrated in FIG. 1.

Figure 2:
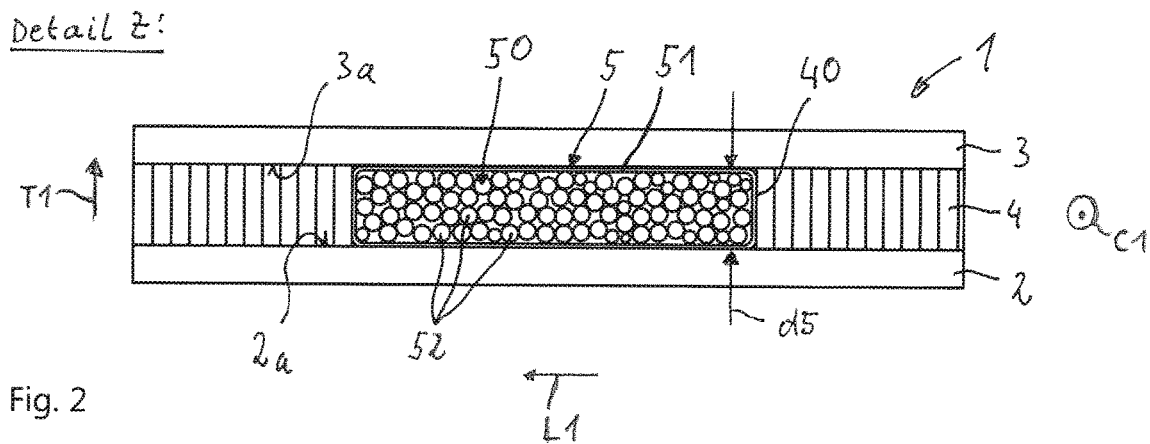
FIG. 2 shows a detailed view of an internal cladding part according to one exemplary embodiment of the invention, wherein the detailed view is derived from the region identified by the letter Z in FIG. 1.

FIG. 2 in an exemplary and schematic manner shows a sectional view of the internal cladding part 1. The internal cladding part 1 has a first cover layer 2, a second cover layer 3, a core layer 4, for example in the form of a honeycomb structure, and an insulation structure 5.

The cover layers 2, 3 are in each case implemented as, for example, sheet-shaped or shell-shaped components which extend in a planar manner. In particular, the cover layers 2, 3 extend in each case along a cladding part longitudinal direction L1 and along a cladding part circumferential direction C1. The cover layers 2, 3 are disposed so as to be mutually spaced apart in a cladding part thickness direction T1 which extends transversely to the cladding part longitudinal direction L1 and to the cladding part circumferential direction C1. The cover layers 2, 3 can in particular be formed from a fibre-reinforced plastics material, for example from a glass-fibre-reinforced thermosetting plastic material.

The core layer 4 in FIG. 2 is only schematically illustrated and can be embodied, for example, as a honeycomb structure 4 having a multiplicity of webs, wherein the webs conjointly form a multiplicity of individual honeycombs, for example hexagonal, rectangular, or generally polygonal, honeycombs. The webs that form the honeycombs can be formed, for example, from paperboard, or resin-impregnated natural fibres, respectively, or a plastics material, in particular a fibre-reinforced plastics material. The core layer 4 in terms of the cladding part thickness direction T1 is disposed between the first and the second cover layer 2, 3 and extends in a planar manner between the cover layers 2, 3. The core layer 4 is in particular connected, in particular adhesively bonded, to a first internal face 2a of the first cover layer 2 that faces the second cover layer 3, and a second internal face 3a of the second cover layer 3 that faces the first cover layer 2. An internal cladding part 1 constructed in a sandwich-shaped manner is thus implemented.

As can be seen in FIG. 2 and FIG. 4, in which the first cover layer 2 is omitted, the core layer 4 has a recess which defines a receptacle cavity 40. The recess has in particular a planar extent which is optionally larger than the planar extent of individual honeycombs of a honeycomb structure. As is illustrated in an exemplary manner in FIG. 2, the receptacle cavity 40 can in particular be implemented as a cavity which is free of a core layer and extends between the first internal face 2a of the first cover layer 2 and the second internal face 3a of the second cover layer 3. The receptacle cavity 40 in terms of the cladding part thickness direction T can thus in particular be delimited by the internal faces 2a, 3a of the cover layers 2, 3, wherein no material of the core layer 4 is present between the internal faces 2a, 3a in the region of the receptacle cavity 40.

Figure 3:
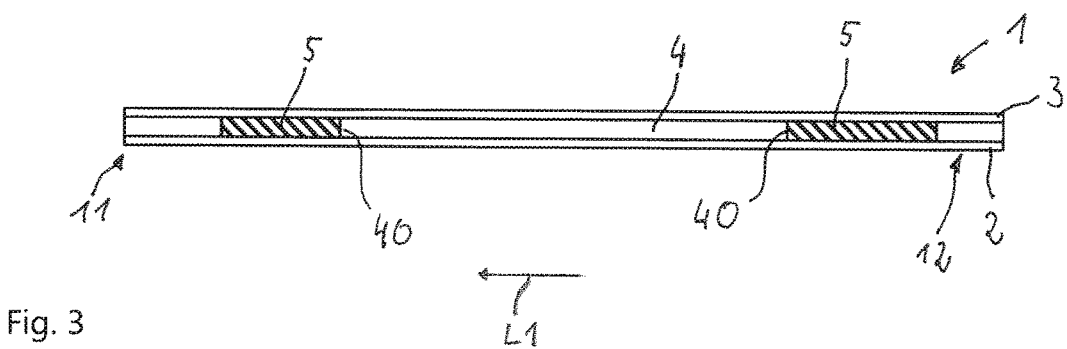
FIG. 3 shows a sectional view of an internal cladding part according to one further exemplary embodiment of the invention.

As is schematically illustrated in particular in FIGS. 3 and 4, a plurality of receptacle cavities 40 which in terms of the cladding part longitudinal direction L1 are disposed so as to be mutually spaced apart and optionally extend so as to be mutually parallel can be provided. As is illustrated in an exemplary manner in FIG. 4, the receptacle cavities 40 can in each case extend in a stripe-shaped manner along the cladding part circumferential direction C1. As can moreover be seen in FIG. 4, it can be provided that a plurality of, for example two, receptacle cavities 40 which are mutually spaced apart in the cladding part circumferential direction C1 and mutually separated by a web 45 of the core layer 4 that extends in the cladding part longitudinal direction L1 and the cladding part circumferential direction C1 can also be provided. The optional web 45 improves the mechanical strength of the internal cladding part 1. As can moreover be seen in FIG. 4, the internal cladding part 1 can have one or a plurality of passage openings 10 which extend through the cover layers 2, 3 and the core layer 4, and serve as window openings.

The insulation structure 5 is illustrated in an exemplary and schematic manner in detail in FIG. 2. The insulation structure 5 has an insulation core 50 and a film sheath 51. The insulation core 50 is formed from a porous, thermally insulating, material. In particular, the insulation core 50 can be formed by a pulverulent material 52 from a solid substance such as, for example, Aerosil®. The particle size of the individual particles of the pulverulent material 52 of the insulation core 50 is not illustrated true to scale in FIG. 2. The film sheath 51 is from a gas-tight material, for example a plastics material which is optionally coated with a metal material. The film sheath 51 completely encloses, or encases, respectively, the insulation core 50 such that the insulation core 50 is enclosed in a gas-tight manner in the film sheath 51. The film sheath 51 is moreover evacuated, that is to say that the air has been extracted from the interior of the film sheath 51 having the insulation core 50. In particular, a pressure in the interior of the film sheath 51 can be less than or equal to 1% of the ambient pressure, in particular less than or equal to 0.5% of the ambient pressure.

As is schematically illustrated in FIG. 2, the insulation structure 5 in the receptacle cavity 40 is disposed between the first and the second cover layer 2, 3 and in terms of the cladding part thickness direction T is thus integrated in the cross section of the internal cladding part 1. The film sheath 51 of the insulation structure 5 is optionally connected, for example adhesively bonded, to the first internal face 2a and to the second internal face 3a, as is schematically illustrated in FIG. 2. The insulation structure 5 in terms of the cladding part thickness direction T can in particular have a thickness d5 in a range between 3 mm and 11 mm. As can be seen in FIG. 4, one insulation structure 5 can in each case be disposed in each of the receptacle cavities 40 of an internal cladding part 1. It is also conceivable for a plurality of insulation structures 5 which are disposed in a planar manner in succession, or beside one another, respectively, to be provided per receptacle cavity 40.

As is schematically illustrated in FIGS. 1 and 4, the internal cladding part 1 by way of the cladding part longitudinal direction L1 extends along the fuselage longitudinal direction L100. The internal cladding part 1 is disposed in the fuselage interior IR, wherein the second cover layer 3 is oriented so as to face the formers 110, or the former head 112, respectively. As is in particular illustrated in FIG. 4, the internal cladding part 1 in terms of the fuselage longitudinal direction L100 overlaps at least one former 110, and can be fastened, for example, to the former 110 and/or to a longitudinal support 120. It is illustrated in an exemplary manner in FIG. 4 that the internal cladding part 1 overlaps with two formers 110 which are successive in the fuselage longitudinal direction L100. In the fuselage structure 100 illustrated in an exemplary manner in FIG. 4, a first end region 11 of the internal cladding part 1 is disposed between two formers 110 which are successive in the fuselage longitudinal direction L100, and a second end region 12 which in terms of the cladding part longitudinal direction L1 lies opposite the first end region 11 is likewise disposed between two formers 110 which are successive in the fuselage longitudinal direction L100. In general, it can be provided that an end region 11, 12 of the internal cladding part 1 is in each case disposed between two formers 110 which are successive in the fuselage longitudinal direction L100.

As is moreover illustrated in FIG. 4, the insulation structure 5 of the internal cladding part 1 in terms of the fuselage longitudinal direction L100 is disposed so as to overlap with the former 110. As can be seen in FIG. 4, this is to say that one former 110 and one insulation structure 5 of the internal cladding part 1 in terms of the fuselage longitudinal direction L100 are in each case disposed at the same position. The thermal insulation of the fuselage structure 100 is thus improved at least in the region of the formers 110 by the insulation structure 5 which is integrated in the cross section of the internal cladding part 1. As can be seen in FIG. 1, the internal cladding part 1, while providing an improved insulation effect, has a relative minor thickness d1 since the insulation structure 5 between the cover layers 2, 3 is disposed in a cavity 40 defined by the core layer 4. The available space of the fuselage interior space IR, while providing positive thermal insulation in the region of the former, can thus be utilized in an even more efficient manner.

Figures 5, 6:
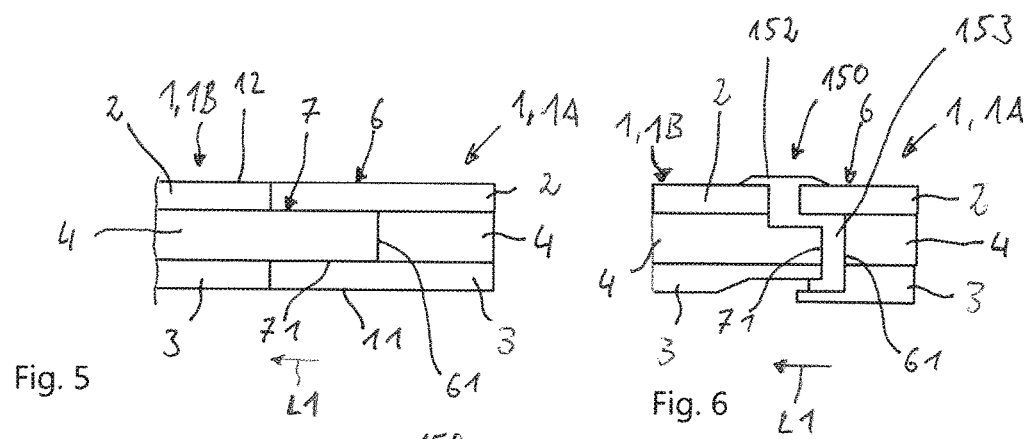
FIG. 5 shows a detailed view of a connection of two internal cladding parts according to one exemplary embodiment of the invention.
FIG. 6 shows a detailed view of a connection of two internal cladding parts according to one further exemplary embodiment of the invention.
Figure 7:
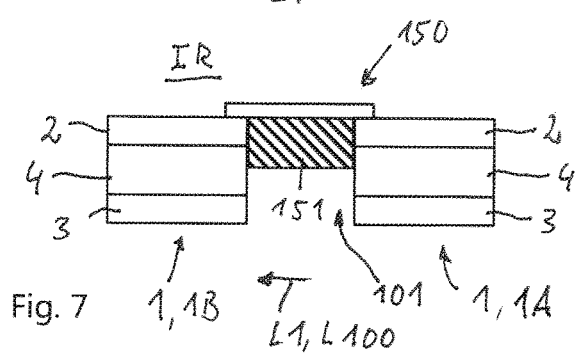
FIG. 7 shows a detailed view of a connection of two internal cladding parts according to one further exemplary embodiment of the invention.

For reasons of clarity, only one internal cladding part 1 is illustrated in FIG. 4. Of course, it can be provided that a plurality of internal cladding parts 1 are disposed in succession in the fuselage longitudinal direction L100. The two internal cladding parts 1 which are successive in the fuselage longitudinal direction L100 are in each case connected to one another at a joint. FIGS. 5 to 7 in an exemplary manner show in each case potential connections between a first internal cladding part 1A and a second internal cladding part 1B which is successive in the fuselage longitudinal direction.

It is illustrated in an exemplary manner in FIG. 5 that the first internal cladding part 1A on an end region 11 that faces the second internal cladding part 1B has a groove 61 which is formed by the cover layers 2, 3 which in the connection part longitudinal direction L1 project in relation to the core layer 4. The second internal cladding part 1B on an end region 12 that faces the first internal cladding part 1A has a tongue 71 which is formed by the core layer 4 which in the connection part longitudinal direction L1 projects in relation to the cover layers 2, 3. As is illustrated in an exemplary manner in FIG. 5, the tongue 71 engages in the groove 61. Optionally, the first internal cladding part 1A at an opposite end region 12 can have a tongue (not illustrated), and the second internal cladding part at an opposite end region 11 can have a groove (not illustrated). In general, a first end region 11 of the internal cladding part 1 can form a first connection structure 6, and a second end region 12 of the internal cladding part 1 that in terms of the connection part longitudinal direction L1 lies opposite the first end region can form a second connection structure 7. The connection structures 6, 7 can optionally be configured so as to be mutually complementary. In general, the connection structures 6, 7 can be profiled, or can define a profiled cross section, respectively.

It is illustrated in an exemplary manner in FIGS. 6 and 7 that the internal cladding part 1A, 1B are connected by a connecting strip 150 which is at least partially disposed between the internal cladding parts 1A, 1B. The first connection structure 6 of the first internal cladding part 1A in FIG. 6 again has a groove 61. As opposed to FIG. 5, the groove 61 is formed as a depression of the second cover layer 3 and of the core layer 4 that extends along the cladding part longitudinal direction L1. It is also conceivable for the groove 61 to be formed by a depression of the core layer 4. In general, the first connection structure 6 can have a groove 61. The second connection structure 7 of the second internal cladding part 1B has a tongue 71, or a protrusion, respectively, which in FIG. 6 is formed by the second cover layer 3 and the core layer 4, the latter two in the connection part longitudinal direction L1 projecting in each case in relation to the first cover layer 2. Other configurations which implement the second connection structure 7 as a tongue 71 are also conceivable. As is moreover illustrated in an exemplary manner in FIG. 6, the second cover layer 3 of the second internal cladding part 1B in the region of the connection structure 7 has a reduced thickness. The connecting strip 150 has a cap 152 which is disposed so as to overlap with the first cover layer 2 of the first and the second connection part 1A, 1B, and a web portion 153 which is connected to the cap 152 and is disposed between the first internal cladding part 1A and the second internal cladding part 1B. The web portion 153 has a cross-section which is in each case shaped so as to be complementary to the first connection structure 6 of the first internal cladding part 1A and to the second connection structure 7 of the second internal cladding part 1B. In general, the connecting strip 150 is connected, for example in a form-fitting manner, to the first connection structure 6 of the first internal cladding part 1A and to the second connection structure 7 of the second internal cladding part 1B.

As is shown in FIG. 7, the connecting strip 150 can also be configured as a simple cover strip which covers a gap 101 which in terms of the fuselage longitudinal direction L100 is formed between the internal cladding parts 1A, 1B.

As is shown in an exemplary manner in FIG. 7, the connecting strip 150 can in each case be disposed so as to overlap with the first cover layer 2 of the first and the second connection part 1A, 1B. The connecting strip 150 can be connected to the cover layers 2 by way of, for example, a clip connection (not illustrated), or any other form-fitting connection. In general, the connecting strip 150 is connected to the first connection structure 6 of the first internal cladding part 1A and to the second connection structure 7 of the second internal cladding part 1B. Furthermore optionally, an insulation layer 151, for example in the form of an insulation structure 5 as has been described above, can be provided on a rear side of the connecting strip 150 that is oriented so as to face away from the fuselage interior space IR. The insulation structure 5 herein can be disposed, for example, between the connecting strip 150 and a covering tier (not illustrated), wherein the covering tier can in particular be formed by a fibre-reinforced mat which is connected in a materially integral manner to the covering tier.

FIG. 8 in an exemplary manner shows a further fuselage structure 100, wherein a plan view of the fuselage structure 100 is schematically shown in view A of FIG. 8, and a sectional illustration of the fuselage structure 100 illustrated in view A is schematically shown in view B of FIG. 8. The sectional illustration shown in view B of FIG. 8 is derived in a section along the line X-X, as is plotted in view A of FIG. 8. As opposed to FIG. 4, a first internal cladding part 1A in terms of the fuselage longitudinal direction L100 overlaps a total of four formers 110, and thus extends across at least three former sections which are in each case formed between two formers 110 which are successive in the fuselage longitudinal direction L100. A second internal cladding part 1B, which follows the first internal cladding part 1A in the fuselage longitudinal direction L100, overlaps two formers 110 which are successive in the fuselage longitudinal direction L100. The second internal cladding part 1B thus completely covers one former section as well as partially covers two further former sections. As can be clearly seen in FIG. 8, the first as well as the second internal cladding part 1A, 1B terminate in each case just beside a former 110. In general, it can be provided that an end region 11, 12 of the internal cladding part 1 is in each case disposed between two formers 110 which are successive in the fuselage longitudinal direction L100. On account of this arrangement, the overall number of internal cladding parts 1 required for covering a predefined number of former sections is reduced in comparison to the arrangement shown in an exemplary manner in FIG. 4.

The first and the second internal cladding part 1A, 1B have in each case insulation structures 5 which are integrated in the cross section, such as is shown, for example, in FIG. 2 and has been explained in detail above. As is furthermore illustrated in an exemplary manner in FIG. 8, the insulation structures 5 in terms of the fuselage longitudinal direction L100 are in each case disposed so as to correspond to the position of the formers 110.

FIG. 8 furthermore shows that the first and the second internal cladding part 1A, 1B are in each case connected by one connecting strip 150. The latter in FIG. 8 in view B is illustrated in an exemplary manner only as a web having a rectangular cross section, which engages in connection structures 6, 7 of the internal cladding parts 1A, 1B that are implemented as grooves, or is inserted into the connection structures 6, 7. In the fuselage structure 100 which is illustrated in an exemplary manner in FIG. 8 and in which the number of internal cladding parts 1 is reduced, the number of connecting strips 150, or generally of the connection regions in which two internal cladding parts 1A, 1B are connected, respectively, is consequently also reduced. This leads to an improved acoustic and thermal insulation of the interior space IR. On account of the arrangement of the end regions 11, 12 of the internal cladding parts 1 between the formers 110, an additional thermal insulation of the connection regions is furthermore facilitated, for example by attaching an insulation layer 151 to the connecting strip, as is shown in an exemplary manner in FIG. 7, or by attaching additional primary insulation between the internal cladding parts 1 and the external skin 130.

While the present invention has been explained in an exemplary manner above by means of exemplary embodiments, the present invention is not limited thereto but can be modified in various ways. In particular, combinations of the above exemplary embodiments are also conceivable.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An internal cladding part for cladding a fuselage structure of an aircraft, comprising:
　　a first cover layer that extends in a planar manner;
　　a second cover layer that extends in a planar manner;
　　a core layer which is disposed between the first and the second cover layer and is connected to the first and the second cover layer and defines a receptacle cavity; and
　　an insulation structure having a porous insulation core and an evacuated film sheath that encases the insulation core in a gas-tight manner;
　　wherein the insulation structure is disposed in the receptacle cavity between the first and the second cover layer.

2. The internal cladding part according to claim 1, wherein the receptacle cavity is free of a core layer and extends between a first internal face of the first cover layer that faces the second cover layer and a second internal face of the second cover layer that faces the first cover layer, and wherein the film sheath of the insulation structure is connected, in particular adhesively bonded, to the first internal face and to the second internal face.

3. The internal cladding part according to claim 1, wherein the porous insulation core is formed by a pulverulent material.

4. The internal cladding part according to claim 1, wherein the insulation structure has a thickness in a range between 3 mm and 11 mm and extends between the first and the second cover layer.

5. The internal cladding part according to claim 1, wherein the first cover layer and the second cover layer are in each case formed from a fiber-reinforced plastics material.

6. The internal cladding part according to claim 1, wherein the core layer defines the receptacle cavity in the form of an elongate strip.

7. The internal cladding part according to claim 1, wherein the core layer defines at least two receptacle cavities which are disposed so as to be spaced apart along a cladding part longitudinal direction (L1) and extend so as to be mutually parallel, and wherein one insulation structure is disposed in each receptacle region.

8. The internal cladding part according to claim 1, wherein a first end region of the internal cladding part forms a first connection structure, and wherein a second end region of the internal cladding part that lies opposite the first end region forms a second connection structure.

9. The internal cladding part according to claim 8, wherein the first connection structure has a groove, and the second connection structure has a tongue.

10. The internal cladding part according to claim 3, wherein the pulverulent material is pyrogenic silica.

* * * * *